Figure 1:
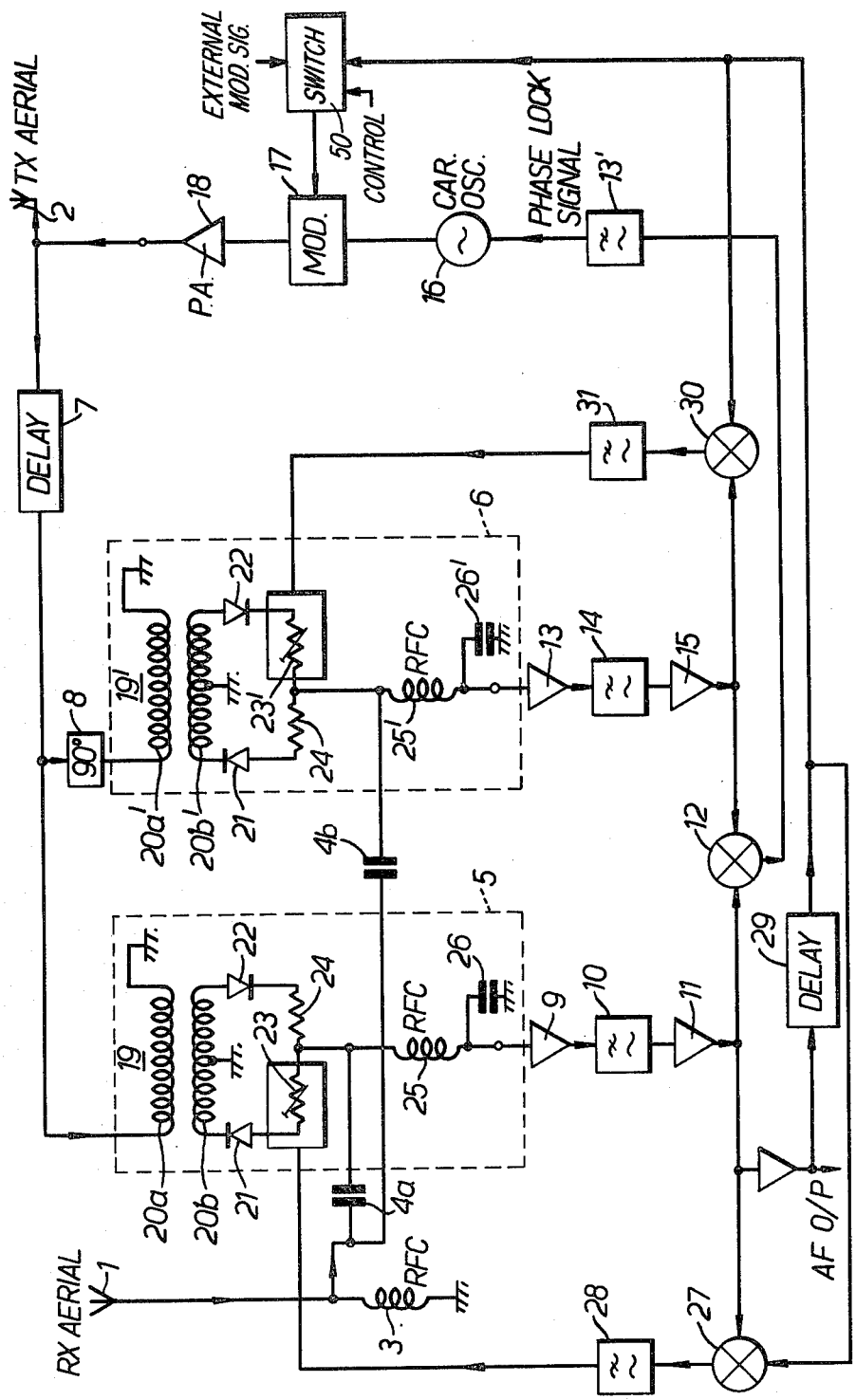

United States Patent [19]

Richardson

[11] 4,353,127

[45] Oct. 5, 1982

[54] DUPLEX TRANSCEIVER ARRANGEMENTS FOR REBROADCAST OF SIGNALS

[75] Inventor: Christopher K. Richardson, Romsey, England

[73] Assignee: Plessey Handel und Investments AG, Zug, Switzerland

[21] Appl. No.: 155,763

[22] Filed: Jun. 2, 1980

[30] Foreign Application Priority Data

Jun. 8, 1979 [GB] United Kingdom .................. 7919963

[51] Int. Cl.³ ........................... H04J 1/00; H04L 5/14
[52] U.S. Cl. ......................................... 370/32; 455/24
[58] Field of Search ............... 370/32, 24, 75; 455/24, 455/18, 7

[56] References Cited

U.S. PATENT DOCUMENTS 3,696,429 10/1972 Tressa .................................. 455/24

Primary Examiner—Douglas W. Olms
Attorney, Agent, or Firm—Fleit & Jacobson

[57] ABSTRACT

A duplex transceiver comprises a receiver aerial and a transmitter aerial, a pair of balanced mixers each fed from the transmitter aerial and from the receiver aerial, a phase quadrature device interposed in a signal path between one of the aerials and a first one of the balanced mixers, a multiplier fed from the mixers, an oscillator/modulator arrangement feeding the transmitter aerial and phased locked to the frequency of a received carrier signal by means of a phase control signal fed from the multiplier, a first phase detector fed from that first one of the balanced mixers which is fed via the phase quadrature device, a delay device via which the said first phase detector is fed from a second one of the balanced mixers, thereby to provide a control signal which is fed back to control the balance of the first balanced mixer, and a second phase detector fed from the second balanced mixer with an undelayed signal and, via the delay device, with a delay signal from the first one of the balanced mixers, thereby to produce a second control signal which is fed back to control the balance of the second balanced mixer, from which an output signal from the transceiver is derived. Alternative AM and FM embodiments are disclosed.

9 Claims, 2 Drawing Figures

DUPLEX TRANSCEIVER ARRANGEMENTS FOR REBROADCAST OF SIGNALS

This invention relates to duplex/rebroadcast transceivers and more particularly it relates to AM and FM duplex rebroadcast transceivers.

According to one aspect of the present invention an AM duplex transceiver comprises a receiver aerial and a transmitter aerial, a pair of balanced mixers each fed from the transmitter aerial and from the receiver aerial, a phase quadrature device interposed in a signal path between one of the said aerials and one of the said balanced mixers, a multiplier fed from the said mixers, an oscillator/modulator arrangement feeding the transmitter aerial and phase locked to the frequency of a received carrier signal by means of a phase control signal fed from the multiplier, a first phase detector fed from that one of the balanced mixers which is fed via the phase quadrature device, a delay device via which the said first phase detector is fed also from the other of the balanced mixers thereby to provide a control signal which is fed back to control the balance of the said one balanced mixer, and a second phase detector fed from the said other of the balanced mixers with an undelayed signal and via the said delay device with a delayed signal from the said other of the balanced mixers thereby to produce a second control signal which is fed back to control the balance of the said other balanced mixer from which an output signal from the transceiver is derived.

According to another aspect of the invention an AM rebroadcast transceiver comprises a receiver aerial for receiving a signal to rebroadcast and a transmitter aerial, for rebroadcasting the received signal at the same frequency, a pair of balanced mixers each fed from the transmitter aerial and from the receiver aerial, a phase quadrature device interposed in a signal path between one of the said aerials and one of the said balanced mixers, a multiplier fed from the said mixers, an oxcillator/modulator arrangement feeding the transmitter aerial and phase locked to the frequency of a received carrier signal by means of a phase control signal fed from the multiplier, a first phase detector fed from that one of the balanced mixers which is fed via the phase quadrature device, a delay device via which the said first phase detector is fed also from the other of the balanced mixers thereby to provide a control signal which is fed back to control the balance of the said one balanced mixer, and a second phase detector fed from the said other of the balanced mixers with an undelayed signal and via the said delay device with a delayed signal from the said other of the balanced mixers thereby to produce a second control signal which is fed back to control the balance of the said other balanced mixer.

The AM transceiver may include a first low pass filter via which the said multiplier is fed from the said one balanced mixer, a second low pass filter via which the said multiplier is fed from the said other of the balanced mixers, third and fourth low pass filters via which the said first and second phase detectors respectively are arranged to feed the balanced mixers and a fifth low pass filter via which the multiplier is arranged to feed the phase control signal to the oscillator of the oscillator/modulator arrangement.

The transceiver may be arranged to include a further delay device which may be introduced into a signal path between the transmitter aerial and the mixers to compensate for delay between the aerials experienced by signals fed therebetween from the transmitter aerial to the receiver aerial.

The balanced mixers may each comprise a pair of diodes and a transformer arranged in the form of a half ring mixer, the transmitter aerial being arranged to feed the primary winding of the transformer and the diodes being connected in series with two balancing resistors across the secondary winding of the transformer.

One of the balancing resistors may be a voltage sensitive resistor to which a signal from an appropriate phase detector is fed.

The oscillator/modulator arrangement may be arranged to feed the transmission aerial via a power amplifier.

The oscillator/modulator arrangement may comprise a separate modulator fed from a carrier frequency oscillator.

Figure 2:
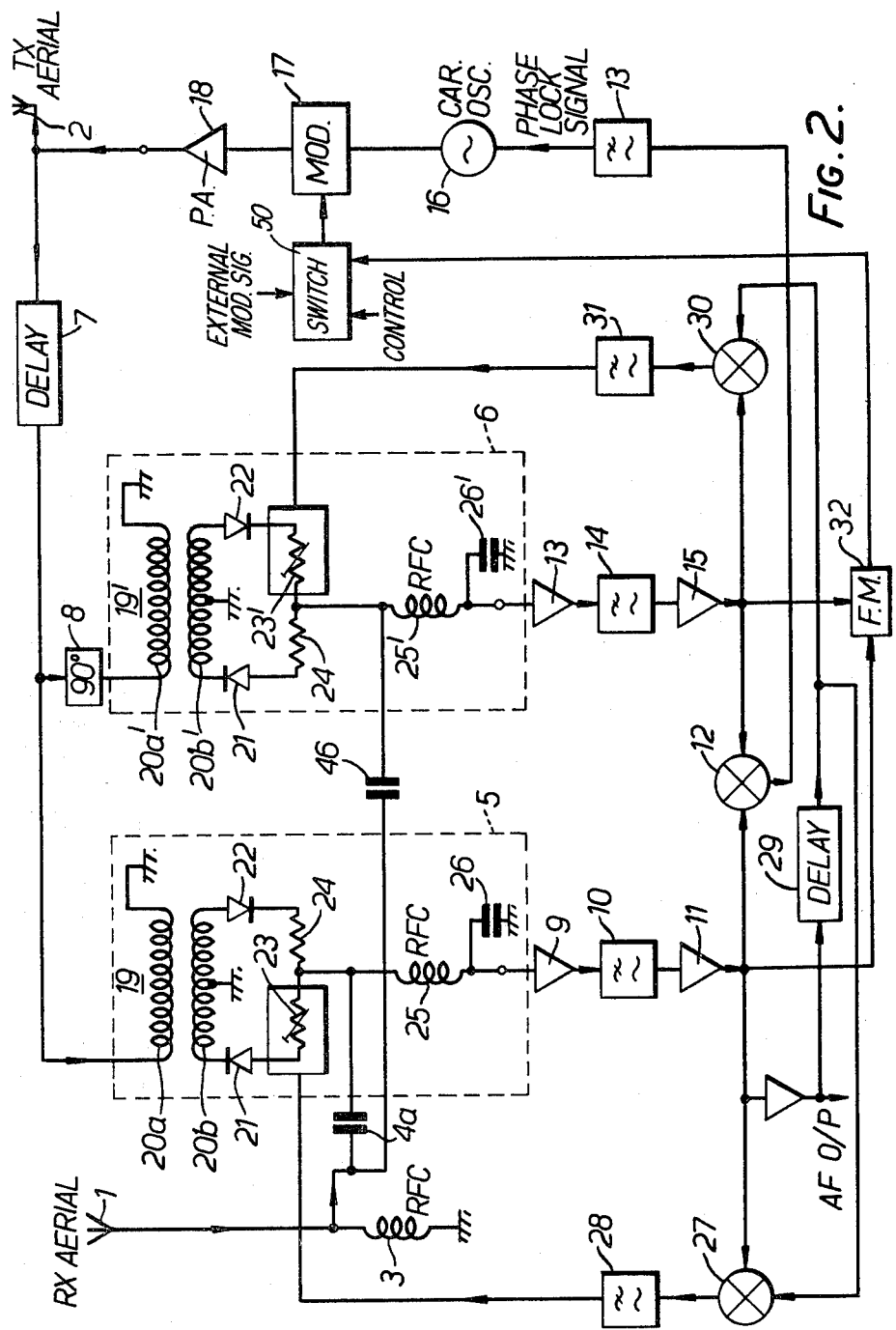

Exemplary embodiments of the invention will now be described by way of example with reference to the accompanying drawings wherein FIG. 1 is a general schematic block diagram of an AM rebroadcast transceiver and FIG. 2 is a general schematic block diagram of an FM rebroadcast transceiver.

Referring to FIG. 1, the transceiver comprises a receiver aerial 1 and a transmission aerial 2. In operation of the transceiver, signals received at the receiver aerial 1 are amplified and re-transmitted at the same frequency from the transmission aerial 2. The present system is concerned exclusively with the rebroadcasting of amplitude modulated signals although it is envisaged that a system may be provided which is a combination of the present system and a system for FM rebroadcast which is described in our British patent application No. 10360/76.

The receiving aerial 1 is connected to an RF choke 3 and signals from the aerial are fed via coupling capacitors 4a and 4b to balanced mixers shown within the broken lines 5 and 6. The balanced mixers 5 and 6 are fed with a signal from the transmission aerial 2 via a delay device 7. The balanced mixer 5 is fed directly from the delay device 7 and the balanced mixer 6 is fed via a phase quadrature device 8. Output signals from the balanced mixer 5 are fed via an amplifier 9, a low pass filter 10 and an amplifier 11 to a multiplier 12 and output signals from the balanced mixer 6 are fed via an amplifier 13 a low pass filter 14 and an amplifier 15 to the multiplier 12. An output signal from the multiplier 12 is fed via a low pass filter 13 to provide a phase locking signal for a carrier frequency oscillator 16. Signals from the oscillator 16 are fed via a modulator 17 and a power amplifier 18 to the transmission aerial 2. Due to operation of a feedback loop including the balanced mixers 5 and 6 the multiplier 12 and the carrier frequency oscillator 16, the carrier frequency transmitted from the transmission aerial 2 is phase locked to the frequency received at the receiving aerial 1. The balanced mixers 5 and 6 operate to cancel any carrier frequency fed back from the transmission aerial to the receiving aerial but in order to ensure that the fed back modulation is also cancelled the balance condition of the modulators 5 and 6 is controlled by means of two further feedback loops.

The balanced mixer 5 will now be described in detail and since the mixers 5 and 6 are similar, the same reference numerals will be used for both, with a dashed suffix applied to the reference numerals applied to the mixer 6 for distinguishing purposes. The balanced mixer 5 comprises a double wound transformer 19 the primary winding 20 of which is fed from the delay device 7. The secondary winding is arranged to feed a pair of diodes 21, 22 which are serially connected to a pair of resistors 23, 24. An input signal from the coupling capacitor 4a and originating at the receiver aerial 1 is fed to the junction between the resistors 23 and 24 and an output signal from the mixers is fed via an RF choke 25, which is de-coupled by a capacitor 26, to the amplifier 9. The resistor 23 is a voltage variable resistor.

The audio output frequency from the transceiver is developed at the output of the amplifier 11, and in order to adjust the balance of the balanced mixers 5 and 6 so as to cancel the modulation of any feedback signal between the transmission aerial 2 and the receiving aerial 1, a feedback control signal is developed in a phase detector 27. The feedback control signal is fed via a low pass filter 28 to control the value of the resistor 23. In order to develop the feedback control signal, the phase comparator 27 is fed directly via the amplifier 11 and also via a further delay device 29. The delay device 29 is provided to afford a phase distinguishing characteristic between the modulation on the signal transmitted from the aerial 2 and the modulation received by the aerial 1. Thus it will be appreciated that the resistor 23 is adjusted so that the leakage modulation signal between the aerials 2 and 1 appearing at the output from the amplifier 11 is minimised.

In a similar manner the resistor 23' is controlled by means of a signal developed in a phase detector 30 and fed via a low pass filter 31 to control the value of the resistor 23'. The phase detector 30 is fed via the delay device 29 and additionally from the amplifier 15 so that the variable resistor 23' is adjusted to balance the modulator 6 so as to nullify the modulation component of any feedback signal between the transmission aerial 2 and the receiving aerial 1 which appears at the output from the amplifier 15. Thus it can be seen that the signal received at the aerial 1 is phase locked to the frequency of the carrier oscillator 16 and re-transmitted by the aerial 2, the re-transmitted modulation being identical to the received modulation but phase shifted due to the delay device 29.

The delay device 7 is included to compensate for the small delay experienced by the feedback signal between the transmission aerial 2 and the receiving aerial 1.

It will be appreciated that when the oscillator 16 is phase locked to the received carrier frequency, the side bands, which are fed from the mixer 5 will be in phase and will produce the audio frequency output signal from the amplifier 11, and the side bands in the "phase quadrature leg" fed from the balanced mixer 6 must therefore be in antiphase and will cancel to produce zero output from the amplifier 15.

The phase detector 27 operates to nullify the unwanted modulation signal at the output of the amplifier 11 due to feedback from the transmission aerial 2 and the receiver aerial 1 and in a similar manner the phase detector 30 operates to nullify the unwanted modulation signal at the output of the amplifier 15.

It will be appreciated that if the delay device 29 were omitted and the output of the amplifier 11 were fed back directly to modulate the oscillator 16, the unwanted feedback modulation, which is unavoidably transmitted from the transmission aerial 2 to the receiver aerial 1, would be indistinguishable from the received signal modulation and so could not be selectively cancelled.

Various modifications may be made to the arrangement just before described without departing from the scope of the invention. For example the phase quadrature device 8 may alternatively be included in the feed from the transmission aerial 2 to the balanced mixer 5 or as another alternative it may be included in the feed from the receiving aerial 1 to the balanced mixer 5 or in the feed from the receiving aerial 1 to the balanced mixer 6. Thus the 90° phase shift device 8 may be removed for example from the position shown and as an alternative, positioned between the coupling capacitor 4b and the balanced mixer 6.

Referring now to FIG. 2, in order to provide a re-broadcast system which might alternatively be suitable for FM, the outputs from the filters 10 and 14 may be fed to an FM demodulator 32 and the resulting audio frequency produced is applied to frequency modulate the modulator 17. Such an FM system is described in detail in our British patent application No. 10360/76.

It will be appreciated therefore, that by suitably adapting the modulator 17 in accordance with the type of modulation required, the system described may alternatively be used for AM or FM.

It will also be appreciated that two equipments as described could be used to comprise a full duplex single frequency radio link. The system could be converted to receive and transmit independent signals by disconnecting the AF input to from delay 29 (FIG. 1) and FM element 32 (FIG. 2) modulator 17 and providing a switch 50, controlled by an operator-provided input CONTROL, for reconnecting the modulator 17 to an external modulation source (not shown) for receiving an external modulation signal.

I claim:

1. A duplex transceiver comprising a receiver aerial and a transmitter aerial, a pair of balanced mixers each fed from the transmitter aerial and from the receiver aerial, a phase quadrature device interposed in a signal path between one of the said aerials and one of the said balanced mixers, a multiplier fed from the said mixers, an oscillator/modulator arrangement feeding the transmitter aerial and phased locked to the frequency of a received carrier signal by means of a phase control signal fed from the multiplier, a first phase detector fed from that one of the balanced mixers which is fed via the phase quadrature device, a delay device via which the said first phase detector is fed also from the other of the balanced mixers thereby to provide a just control signal which is fed back to control the balance of the said one balanced mixer, and a second phase detector fed from the said other of the balanced mixers with an undelayed signal and via the said delay device with a delayed signal from the said other of the balanced mixers thereby to produce a second control signal which is fed back to control the balance of the said other balanced mixer from which an output signal from the transceiver is derived.

2. A duplex transceiver as claimed in claim 1 wherein a signal derived from the said other balanced mixer is fed back to provide a modulation signal for the oscillator/modulator arrangement, whereby a received signal received by the receiver aerial is rebroadcast from the transmitter aerial to provide an a.m. rebroadcast function.

3. A transceiver as claimed in claim 2, including a first low pass filter via which the said multiplier is fed from the said one balanced mixer, a second low pass filter via which the said multiplier is fed from the said other of the balanced mixers, third and fourth low pass filters via which the said first and second phase detectors respectively are arranged to feed the balanced mixers, and a fifth low pass filter via which the multiplier is arranged to feed the phase control signal to the oscillator of the oscillator/modulator arrangement.

4. A transceiver as claimed in claim 2, including a further delay device introduced into a signal path between the transmitter aerial and the mixers to compensate for delay between the aerials experienced by signals fed therebetween from the transmitter aerial to the receiver aerial.

5. A transceiver as claimed in claim 4 wherein the balanced mixers each comprise a pair of diodes and a transformer arranged in the form of a half ring mixer, the transmitter aerial being arranged to feed the primary winding of the transformer and the diodes being connected in series with two balancing resistors across the secondary winding of the transformer.

6. A transceiver as claimed in claim 5, wherein one of the balancing resistors is a voltage sensitive resistor to which a signal from an appropriate phase detector is fed.

7. A transceiver as claimed in claim 6, wherein the oscillator/modulator arrangement is arranged to feed the transmission aerial via a power amplifier.

8. A transceiver as claimed in claim 7, wherein the oscillator/modulator arrangement comprises a modulator fed from a separate carrier frequency oscillator.

9. A transceiver as claimed in claim 1, wherein one signal derived from each balanced mixer is fed to a frequency demodulator thereby to produce a signal which is used to frequency modulate the modulator.

* * * * *